March 9, 1937.  J. E. BRANTLY  2,073,093
WELL PIPE AND TOOL JOINT
Filed Nov. 25, 1935
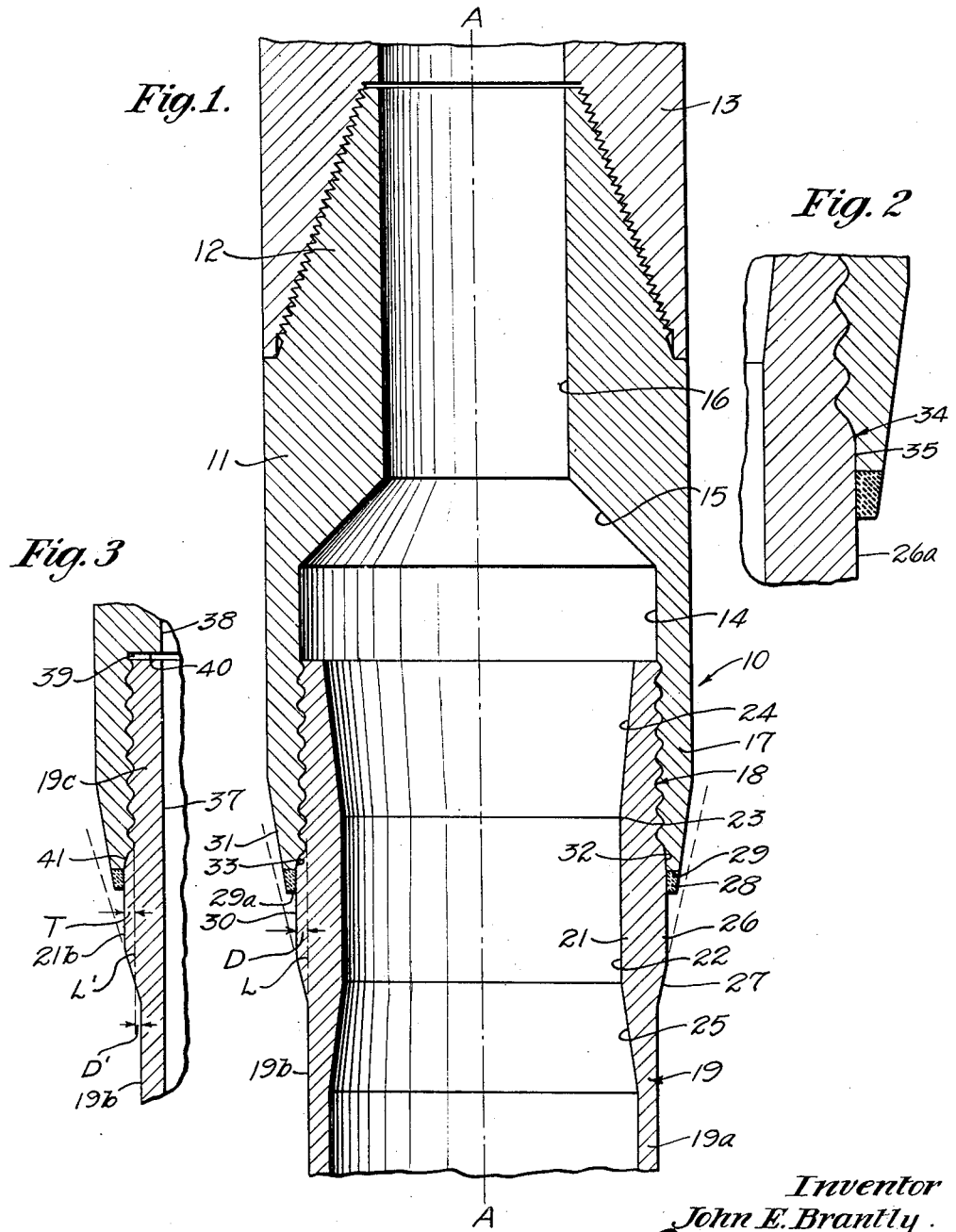
Inventor
John E. Brantly
Attorney.

Patented Mar. 9, 1937

2,073,093

UNITED STATES PATENT OFFICE 2,073,093

WELL PIPE AND TOOL JOINT

John E. Brantly, Avenal, Calif.

Application November 25, 1935, Serial No. 51,385

4 Claims. (Cl. 285—146)

This invention pertains to an improved oil well pipe, coupling or tool joint to be used, for example, as a coupling between joints or stands of drill pipe or for connecting a bit or other tool to the pipe string.

My principal object is to provide a pipe coupling or tool joint of substantially greater strength than the conventional types in common use, and to give to the joint maximum strength consistent with maintaining a maximum pipe size for a joint of given outside diameter. Together with these characteristics, I include in my improved joint the added feature of maintaining at the threaded section of the joint, the maximum internal diameter consistent with maximum strength in the joint parts. In accordance with the invention, I have been able to greatly increase the strength of the joint as compared with the usual pipe or tool couplings, by the use of a different type of thread than is ordinarily used. The common practice has been to use a V-type thread which, while satisfactory from the standpoint of strength where sufficient thickness of the stock in the joint parts is retained to avoid weakening below the maximum strength required, imposes limitations preventing the thicknesses of the parts from being reduced to the extent of providing the maximum external and internal pipe diameters made possible by the present type of construction. These limitations in the usual tool joint result from fatigue in the metal induced by cutting the V-type threads. That is to say, because of the sharp angularity of the cut at the base of the threads, the metal at that point is weakened or fatigued to such an extent that in order to maintain the necessary strength at the threaded section of the joint, the thickness of the parts must be substantially greater than would otherwise be necessary.

In the present tool joint, I use a form of thread which in transverse cross section, has a curved or wave-like shape. Preferably, the cross sectional shape of the threads will correspond substantially to a sine wave curve, for the reason that this type of thread can be cut to give maximum strength with minimum fatigue in the metal. Although not necessarily in all cases, the threaded section of the joint preferably will be given a slight taper in order to insure a tight fit and to simplify screwing the tool joint or coupling onto the pipe. The use of this sine wave thread, as compared with the usual V-type thread, has the important advantage of avoiding any appreciable metal fatigue in cutting the threads, since at no point is the stock cut in the form of a sharp angle groove which unavoidably weakens the metal.

Another feature of the invention is the provision in a joint having this improved type of thread, of internal and external upsets formed in overlapping arrangement, longitudinally of the pipe, so as to distribute the stresses and thereby afford maximum strength for a given pipe thickness. Throughout the joint, I have eliminated all sharp cut angles that tend to cause weak section subject to failure. Another improved feature of the invention resides in the provision of angular external surfaces arranged to prevent abrasion of the metal by circulating fluid flowing upwardly around the pipe, below the projecting shoulder of the box or collar section of the joint. In the present construction, the external surfaces are longitudinally streamlined to prevent the circulating fluid from setting up an eddying flow below the coupling in such manner as to abrade the outer surface of the pipe, or the surface of the coupling itself.

All the above mentioned features and objects of the invention as well as further details thereof, will be more clearly understood and explained to best advantage in the following description of a typical and preferred joint structure embodying the invention. Reference is had to the accompanying drawing, in which:

Fig. 1 shows the joint in longitudinal section;

Fig. 2 is an enlarged fragmentary section showing a variational form of construction; and Fig. 3 is a fragmentary section showing a further variational form of the invention in an internal flush joint, i. e. one in which the bore of the pin section is of uniform diameter.

In the drawing the joint, generally indicated at 10, comprises a coupling section 11, the threaded pin end 12 of which is adapted to be connected to an upper stand of drill pipe 13 where the joint is being used as a drill pipe tool joint coupling. As mentioned before, the joint may also be used for connecting a bit or other tool to the pipe string, in which event the position of the joint will be reversed from that shown, and the coupling pin end 12 will be threaded into the box end of the tool. The coupling 11 has an enlarged internal bore 14 which tapers at 15 to a bore 16 of reduced diameter, extending through the pin end 12.

A box end 17 of coupling 11 has a screw threaded connection at 18 with the end of the pipe 19, and preferably the threads will be formed on a slight longitudinal taper which, for example, need not be greatly in excess of $\frac{1}{16}''$ where the pipe 19 has an external diameter of 4½" to 6⅝" and the length of the joint at 18 is around 4" to 6". It may be stated that in general, the threads will parallel the longitudinal axis A—A of the joint, except for a slight taper of the order indicated. As illustrated, the cross sectional shape of the threads at 18 conforms substantially to a sine wave curve so that at the bases of the threads, the metal is cut in the form of smoothly curved spiral grooves, as distinguished from the sharp angular grooves of a V-type thread. The result is that in the thread cutting process, the metal in pipe 19 and the box end 17 of the coupling at the threaded joint has its maximum strength, having suffered no fatigue at the threads, and consequently the thickness of the pipe and coupling at the joint may be reduced to the minimum dimensions that will have the necessary tensile strength. It may be mentioned that this type of thread, because of its shape characteristics, is adaptable to being formed on the end of the pipe by a forging as well as cutting operation. When the threads are forged on the pipe, the surfaces of the threads may be ground or polished to smoothness, and the threaded box end of the coupling shrunk on the pipe.

Pipe 19 has an internal upset 21 so that at the joint, the thickness of the pipe wall is substantially greater than the normal thickness of the pipe at 19a below the upset. Despite the upset at 21 however, the minimum internal diameter of the joint at 22 is substantially larger than the diameter of bore 16 within the pin end of the usual tool joint coupling. Bore 22 of the internal upset 21 extends at uniform diameter from a point 23 above the lower end of the threaded portion of the pipe, downwardly a substantial distance below the threads. The upper portion of the internal upset is gradually tapered along a surface 24 to the upper end of the pipe. Similarly, bore 22 of the joint gradually enlarges below the upset along surface 25 to the full internal diameter of the pipe at 19a.

The pipe 19 is provided below the threaded portion with an external upset 26 tapering gradually at 27 down to the normal external diameter of portion 19a. It will be noted that the internal and external upsets 21 and 26 are offset in the sense that the taper at 25 increases to the maximum internal diameter of the pipe at a point below that at which taper 27 of the external upset reduces to the normal external diameter of the pipe. Similarly, the taper of surface 24 starts at a point above the upper end of external upset 26 where the stock thickness is reduced by the threads. The feature of forming the internal and external upsets in offset relationship is of importance in that by this arrangement the stresses in the metal are equalized by distribution and weaknesses at any particular cross sectional points are avoided.

If desired, the joint may be welded, as indicated at 28, between shoulder 29 at the lower end of the coupling and the surface of the external upset 26. It will be understood, therefore, that when the pipe or tool joint is to be broken, the parts will be unscrewed at the pin end 12 of the coupling. The connection at 18 thus is preferably made a permanent joint. In some instances it may be desirable to provide a shrunk fit between the joint parts, by heating the box end of the coupling, then screwing up the joint and allowing the coupling to shrink around the pipe. Where a shrunk fit is used, ordinarily the weld at 28 will not be necessary. A square shoulder 29a is formed on the lower end of the weld 29, for engagement with a pipe elevator. It will be noted that the elevator engages the pipe about the cylindric surface 30 of the external upset 26. By virtue of the provision of a square shoulder at 29a and the cylindric surface 30 below, the elevator lifts entirely against the shoulder and consequently is not subjected to stresses tending to spread or open the elevator parts.

In drilling operations, the circulating fluid or mud discharged downwardly through the drill string, flows upwardly around the pipe at substantial velocity. It frequently happens that due to the upward velocity of the circulating fluid and the abrading action of the mud particles and cuttings carried by the fluid, the surface of the pipe, generally indicated at 30 below shoulder 29 of the coupling, is subjected to abrasion to the extent of cavitating the surface of the pipe to a depth where its strength is seriously weakened. The reason for this condition is that the coupling shoulder presents a barrier to the fluid flow, setting up eddy currents in the circulating fluid that cause the abradants carried by the mud to wear away and cavitate the surface of the pipe at 30. In accordance with the invention, this condition is avoided by stream lining the external surfaces of the pin and box sections of the joint in such manner that the rising circulating fluid flows smoothly past the shouldered end of the coupling and the described eddying effect is avoided.

It will be noted that the rising circulating fluid stream is initially deflected outwardly away from the coupling shoulder by the outwardly flaring surface 27 at the lower end of the exterior upset 26. In addition, the outer surface 31 of the coupling adjacent the shoulder 29 is also tapered to give an outward flare away from the shoulder and generally in the direction of surface 27 of the upset. The result is that the circulating fluid stream is deflected in a path substantially as indicated by the dotted lines, away from the pipe surface at 30 and also the tapered surface 31 of the coupling, so that any appreciable wear or abrasion of the outer surfaces at the joint by circulating fluid is avoided.

In the form of the invention shown in Fig. 1, the joint members have a tapered fit at the end of the box 17 beyond the threads, the thread end of the external upset 26 tapering inwardly at 32 to the diameter of the threaded portion of the pipe, and seating against the corresponding tapered coupling surface 33. As will be apparent, this tapered fit enables the joint to be snugly taken up by reason of the gradual angularity of the taper. In some cases it may be desired to provide a parallel fit at the end of the coupling beyond the threads, in which event, as shown in Fig. 2, the outer surface 26a of the external upset is continued at uniform diameter to the point 34 at which the threads start, and the coupling bore 35 beyond the threads is made of uniform diameter corresponding to the diameter of pipe upset. In connection with the amount of external upset ordinarily required to give the joint the desired strength, it may be mentioned that usually the external diameter at the upset 26 need not be in excess of ⅛" greater than the maximum thread diameter, although if required, the diameter of the upset may be increased beyond the relative dimensions given.

Fig. 3 shows a variational embodiment of the invention in the form of an internal flush joint. Here the internal upset is eliminated, and the pipe and coupling bores 37 and 38 are the same uniform diameter. Clearance may or may not be maintained at 39 between the end of the pipe and the coupling shoulder 40, although in the typical form illustrated a slight clearance is shown after the joint has been taken up. Where it is desired to bring the end of the pin flush against the box shoulder, the parts may be taken up further by forcing the joint at the tapered seat 41 sufficiently to expand the box and take up the clearance at 40. In order to provide for necessary strength in the internal flush joint and to compensate for the elimination of the internal upset, the thicknesses of the threaded portion 19c of the pipe and the externally upset portion 21b, are increased in comparison, respectively, with the thicknesses at the end of the threaded portion of the pipe in Fig. 1, and the amount of the upset at 26 beyond the normal external diameter of the pipe. Again, however, the thicknesses of the parts may be increased beyond the proportion shown wherever it is desired to provide further increased strength.

In the form of the invention shown in Fig. 1, preferably the threaded end of the pipe will be upset with relation to its normal or unthreaded outer surface 19b. For example, where the outside diameter of the pipe is from 4½″ to 6⅝″, the bases of the pipe threads may be substantially in line with the outer surface 19b of the pipe, as indicated by the line L, the depth of the threads being approximately ⅛″. Typically, the total thickness of the external upset, represented by the distance at D, will exceed the depth of the threads by 1/16″, making the thickness of the upset substantially 1/16″. In the case of the internal flush joint shown in Fig. 3, the upset at the threaded end of the pipe preferably will be somewhat greater than in the first described form, due to the absence of an internal upset. Here the distance D′ from the normal surface 19b of the pipe to line L′ drawn through the bases of the pipe threads, typically will be about 1/16″ for the pipe sizes mentioned above. As before, the depth of the threads will be about ⅛″, and the thickness T of the external upset 21b substantially 1/16″ from the base of the threads, or ¼″ from the surface 19b of the pipe.

I claim:

1. A well pipe joint comprising tubular box and pipe members having interfitting and substantially uniform depth screw threads extending longitudinally of the joint substantially parallel with the axis of said members, said threads being smoothly and continuously curved in cross sectional form, the minimum root diameter of the pipe threads being at least as great as the normal external diameter of the pipe, and said pipe having a longitudinally extending external annular upset whose thickness in excess of the normal external diameter of the pipe is, immediately beyond the threaded surface of the pipe, greater than the thread depth.

2. A well pipe joint comprising tubular box and pipe members having interfitting and substantially uniform depth screw threads extending longitudinally of the joint substantially parallel with the axis of said members, said threads being smoothly and continuously curved in cross sectional form, the minimum root diameter of the pipe threads being greater than the normal external diameter of the pipe, and said pipe having a longitudinally extending external annular upset whose thickness in excess of the normal external diameter of the pipe is, immediately beyond the threaded surface of the pipe, greater than the thread depth.

3. A well pipe joint comprising tubular box and pipe members having interfitting screw threads that are smoothly and continuously curved in cross sectional form, the root diameter of the pipe threads being at least as great as the normal external diameter of the pipe, the end of said box member forming an annular shoulder projecting radially from an upset portion of the pipe member beyond the threads, and the surface of the pipe member near said shoulder having an outward flare, the outer surface of said box member also being flared outwardly in a corresponding direction from said shoulder but offset radially inward from the projected line of said flared surface on the pipe, so that fluid flowing along the last mentioned surface is directed outwardly away from said shoulder.

4. A well pipe joint comprising tubular box and pipe members having interfitting and substantially uniform depth screw threads extending longitudinally of the joint substantially parallel with the axis of said members, said threads being smoothly and continuously curved in cross sectional form, the minimum root diameter of the pipe threads being at least as great as the normal external diameter of the pipe, said pipe having a longitudinally extending external annular upset whose thickness in excess of the normal external diameter of the pipe is, immediately beyond the threaded surface of the pipe, greater than the thread depth, and an internal annular upset opposite the threaded surface of the pipe and said external upset, the ends of the internal upset being offset longitudinally of the pipe beyond the ends of the external upset.

JOHN E. BRANTLY.